United States Patent
Komeda et al.

(10) Patent No.: US 9,990,751 B2
(45) Date of Patent: Jun. 5, 2018

(54) RADIOACTIVE SUBSTANCE DISTRIBUTION MAP PRODUCING SYSTEM AND METHOD OF PRODUCING RADIOACTIVE SUBSTANCE DISTRIBUTION MAP

(71) Applicant: MITSUBISHI HEAVY INDUSTRIES, LTD., Tokyo (JP)

(72) Inventors: Munehiro Komeda, Tokyo (JP); Yoshikatsu Kuroda, Tokyo (JP); Hiroshi Arakawa, Tokyo (JP); Kei Gemba, Tokyo (JP); Hiroshi Ikebuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 14/763,623

(22) PCT Filed: May 16, 2013

(86) PCT No.: PCT/JP2013/063627
§ 371 (c)(1),
(2) Date: Jul. 27, 2015

(87) PCT Pub. No.: WO2014/115348
PCT Pub. Date: Jul. 31, 2014

(65) Prior Publication Data
US 2015/0363956 A1    Dec. 17, 2015

(30) Foreign Application Priority Data

Jan. 28, 2013  (JP) .................................. 2013-013672

(51) Int. Cl.
*G01T 7/00* (2006.01)
*G01T 1/167* (2006.01)
(Continued)

(52) U.S. Cl.
CPC .............. *G06T 11/60* (2013.01); *G01T 1/167* (2013.01); *G01T 7/00* (2013.01); *G06T 11/206* (2013.01)

(58) Field of Classification Search
None
See application file for complete search history.

(56) References Cited

U.S. PATENT DOCUMENTS

| 6,674,082 | B1 | 1/2004 | Gunn |
| 8,335,363 | B2 | 12/2012 | Stolin et al. |

(Continued)

FOREIGN PATENT DOCUMENTS

| CN | 102498388 | 6/2012 |
| CN | 102692637 | 9/2012 |

(Continued)

OTHER PUBLICATIONS

Kulkarni ("Image display/scaling in OpenLayers vs Google Maps", 2011 http://gis.stackexchange.com/questions/16875/image-display-scaling-in-openlayers-vs-google-maps).*

(Continued)

*Primary Examiner* — Xin Sheng
(74) *Attorney, Agent, or Firm* — Wenderoth, Lind & Ponack, L.L.P.

(57) ABSTRACT

A radioactive substance distribution map producing system includes a radiation detector, a position measuring unit and a radioactive substance distribution map producing apparatus. The radiation detector is loaded on a moving vehicle and measures radiations from radioactive substances. The position measuring unit measures a position of the moving vehicle. The radioactive substance distribution map producing apparatus receives measurement data which contains a measurement result by the radiation detector and position data of the moving vehicle measured by the position mea- (Continued)

1:RADIOACTIVE SUBSTANCE DISTRIBUTION MAP PRODUCING SYSTEM suring unit. The radioactive substance distribution map producing apparatus produces a distribution map of the radioactive substances by using the measurement data obtained at the plurality of positions while the moving vehicle moves.

7 Claims, 10 Drawing Sheets

(51) Int. Cl.
*G06T 11/20* (2006.01)
*G06T 11/60* (2006.01)

(56) References Cited

U.S. PATENT DOCUMENTS

| | | | |
|---|---|---|---|
| 2009/0012745 A1* | 1/2009 | Longman | G01T 7/00 702/179 |
| 2010/0316275 A1 | 12/2010 | Stolin et al. | |
| 2012/0008828 A1 | 1/2012 | Yanoff et al. | |
| 2012/0043467 A1* | 2/2012 | Gueorguiev | G01T 1/2907 250/363.01 |

FOREIGN PATENT DOCUMENTS

| | | |
|---|---|---|
| EP | 2 378 314 | 10/2011 |
| JP | 2001-153952 | 6/2001 |
| JP | 2001-208848 | 8/2001 |
| JP | 2001-311791 | 11/2001 |
| JP | 3897245 | 3/2007 |
| JP | 2009-63589 | 3/2009 |
| JP | 2010-266304 | 11/2010 |
| JP | 2012-251918 | 12/2012 |
| JP | 3181739 | 2/2013 |
| JP | 2013-134105 | 7/2013 |
| WO | 99/60420 | 11/1999 |

OTHER PUBLICATIONS

Sheinfeld, M., et al. ("Software for airborne radiation monitoring system.", International Atomic Energy Agency, 1997).*
International Preliminary Report on Patentability dated Jul. 28, 2015 in corresponding International Application No. PCT/JP2013/063627.
Notification of Reasons for Refusal dated Jun. 7, 2016 in corresponding Japanese Application No. 2013-013672 (with partial English translation).
International Search Report dated Jul. 30, 2013 in corresponding International Application No. PCT/JP2013/063627.
Shin'ichiro Takeda et al., The demonstration test at Fukushima by the "super-wide-angle compton camera", Isotope News, Oct. 1, 2012, No. 702, pp. 14-20 (with machine translation).
Extended European Search Report dated Aug. 22, 2016 in corresponding European Application No. 13873014.8.
Jason M. Jaworski et al., "3D Compton Image Reconstruction Using a Moving 3D-Position-Sensitive Room-Temperature CdZnTe Detector Array", Nuclear Science Symposium and Medical Imaging Conference (NSS/MIC), 2011 IEEE, IEEE, Oct. 23, 2011, pp. 976-981, XP032121567.
First Notice of the Opinion on Examination dated Dec. 21, 2016 in corresponding Chinese Application No. 201380071572.2 (with English translation).

* cited by examiner

1: RADIOACTIVE SUBSTANCE DISTRIBUTION MAP PRODUCING SYSTEM

RADIOACTIVE SUBSTANCE DISTRIBUTION MAP PRODUCING SYSTEM AND METHOD OF PRODUCING RADIOACTIVE SUBSTANCE DISTRIBUTION MAP

TECHNICAL FIELD

The present invention relates to a technique of producing a distribution map of radioactive substances.

BACKGROUND ART

As a radiation detector which measures radioactive substances, various types of devices are known. The Geiger counter is the most primitive radiation detector. Also, the radiation detector applied with the principle of a pinhole camera is also known. In case of the radiation detector of such a pinhole camera type, a measurement range is wide to an extent (viewing angle=about 60 degrees, measurable distance=ten and several meters) and a distribution of the radioactive substances in the measurement range can be measured through once measurement.

The applicant of the present application is developing "the Compton camera" which is more highly efficient than the pinhole camera (for example, reference to Patent Literature 1, Patent Literature 2). The Compton camera utilizes the principle of Compton scattering in which gamma radiation has the nature of a particle. In case of the Compton camera, the viewing angle is wide to be 180° (strictly, 2π steradian in a solid angle) and also the measurable distance is long to be about 30 m. In other words, the measurement range of the Compton camera is much wider than the cameras of other types. Also, the Compton camera measures the energy of the radiation and can identify a kind of the radioactive substance (nuclide) based on the energy measurement data.

CITATION LIST

[Patent Literature 1] JP Patent No. 3,897,245
[Patent Literature 2] JP 2009-63589A

SUMMARY OF THE INVENTION

There is a case that a distribution map of radioactive substances in a wide area (for example, in a range of several hectares) is needed, as in case that an accident has occurred in an atomic power plant. However, conventionally, any technique of producing the distribution map of radioactive substances in the wide area quickly was not proposed.

One object of the present invention is to provide a technique which can produce a distribution map of radioactive substances in a wide area quickly.

In an aspect of the present invention, a radioactive substance distribution map producing system is provided. The radioactive substance distribution map producing system includes a radiation detector, a position measuring unit and a radioactive substance distribution map producing apparatus. The radiation detector is loaded on a moving vehicle to measure the radioactive substances. The position measuring unit measures the position of the moving vehicle. The radioactive substance distribution map producing apparatus receives the measurement data which contains a detection result by the radiation detector and position data of the moving vehicle measured by the position measuring unit. Then, the radioactive substance distribution map producing apparatus produces a distribution map of radioactive substances by using the measurement data at a plurality of positions which are obtained as the moving vehicle moves.

In another aspect of the present invention, a method of producing a radioactive substance distribution map is provided. The method of producing a radioactive substance distribution map contains [A] detecting radioactive substances by using a radiation detector loaded on a moving vehicle; and [B] measuring a position of the moving vehicle. Measurement data contains a detection result by the radiation detector and position data of the moving vehicle. Moreover, the method of producing a radioactive substance distribution map contains [C] producing a distribution map of the radioactive substances by using the measurement data at a plurality of positions which are obtained as the moving vehicle moves.

According to the present invention, the distribution map of the radioactive substances in a wide area can be quickly produced.

DESCRIPTION OF EMBODIMENTS

Hereinafter, the embodiments of the present invention will be described with reference to the attached drawings.

1. Overview of Radioactive Substance Distribution Map Producing System

Figure 1:
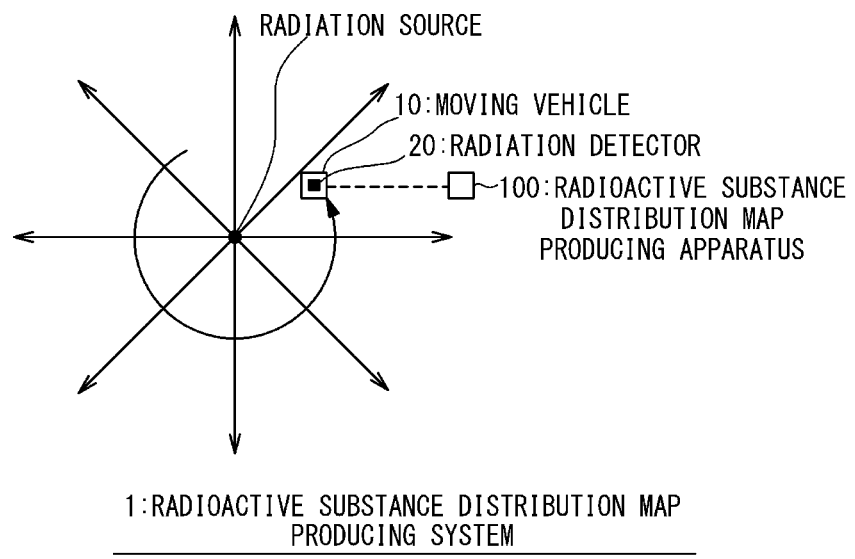
FIG. 1 is a conceptual diagram schematically showing a radioactive substance distribution map producing system according to an embodiment of the present invention.

FIG. 1 is a conceptual diagram schematically showing a radioactive substance distribution map producing system 1 according to an embodiment of the present invention. The radioactive substance distribution map producing system 1 includes a moving vehicle 10 and a radioactive substance distribution map producing apparatus 100.

As the moving vehicle 10, an aircraft, an automobile, a ship and so on is exemplified.

Figure 2:
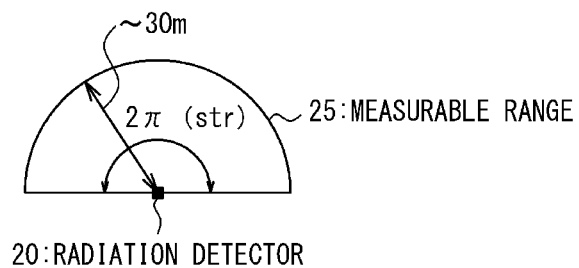
FIG. 2 is a conceptual diagram showing an example of a radiation detector according to the embodiment of the present invention.

A radiation detector 20 is loaded on the moving vehicle 10 to measure or detect (radiations from) radioactive substances. As the radiation detector 20, a Compton camera which has a high sensitivity and a wide measurement range is exemplified (Patent Literature 1, Patent Literature 2). In case of the Compton camera, a measurable range 25 is very wide (a viewing angle=2π steradian, a measurable distance=about 30 m) as shown in FIG. 2. However, the radiation detector 20 of the present embodiment is not limited to the Compton camera and may be the radiation detector of a pinhole camera type. In any case, as the moving vehicle 10 moves, the radiation detector 20 moves, and the measurable range 25 by the radiation detector 20 changes temporally.

The radioactive substance distribution map producing apparatus 100 is an apparatus for producing a radioactive substance distribution map in a wide area and is realized by a computer. The radioactive substance distribution map producing apparatus 100 may be loaded on the moving vehicle 10 with the radiation detector 20 and may be installed in a place different from the moving vehicle 10 to be communicable with the moving vehicle 10. Or, the radioactive substance distribution map producing apparatus 100 may be configured unitarily with the radiation detector 20. In any case, the radioactive substance distribution map producing apparatus 100 produces the radioactive substance distribution map based on the measurement result by the radiation detector 20.

In detail, the radioactive substance distribution map producing apparatus 100 receives "measurement data" from the moving vehicle 10 and the radiation detector 20. The measurement data contains the measurement result by the radiation detector 20 and position data of the moving vehicle 10 at least. Here, according to the present embodiment, because the moving vehicle 10 moves, the measurement data is acquired in a plurality of positions. The radioactive substance distribution map producing apparatus 100 can produce the radioactive substance distribution map by combining the measurement data acquired in the plurality of positions as the moving vehicle 10 moves.

In detail, the radioactive substance distribution map producing apparatus 100 calculates the directions of radiation sources based on the measurement result by the radiation detector 20. Because the measurement data are acquired in the plurality of positions as mentioned above, the directions of the radiation sources can be calculated in the plurality of positions. Accordingly, the radioactive substance distribution map producing apparatus 100 can correctly identify the positions of the radiation sources in "a stereo view" based on the directions of the radiation sources acquired in the plurality of positions. Thus, the radioactive substance distribution map producing apparatus 100 produces the radioactive substance distribution map by combining the positions of one or more radiation sources.

Such a radioactive substance distribution map producing technique could be realized because the following peculiar conditions are met when the measurement object is radiation:

(1) a radiation is radially emitted from the radiation source;
(2) a radiation penetrates a shield; and
(3) a radiation state of the radiation is maintained for a given period (note that the radioactive substances having a half-life period equal to or more than several hours are dealt with). Because the above-mentioned conditions (1) and (2) are met, the positions of the radiation sources can be correctly identified through the stereo view which is based on the measurement data in the plurality of positions which are apart from the radiation sources. Moreover, because the condition (3) is met, it is not necessary to observe the same radiation source from the plurality of positions at the same timing and the measurement data which have been acquired at the different timings can be used and combined. In other words, it is not required to use the plurality of radiation detectors 20 for the radioactive substance distribution map producing technique of the present embodiment and it is enough to use a single radiation detector 20.

Figure 3:
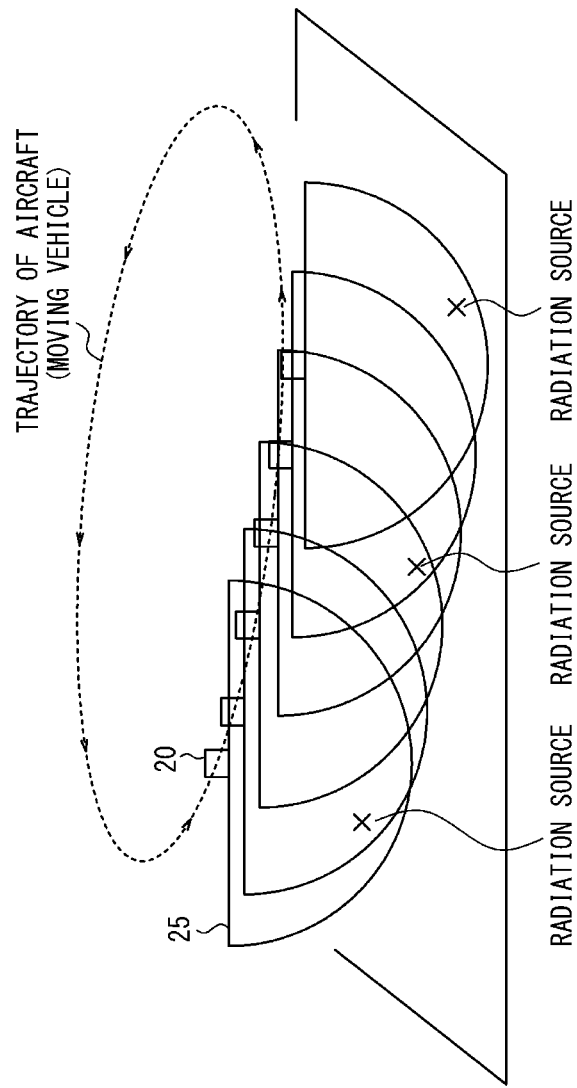
FIG. 3 is a conceptual diagram showing a measurement example according to the embodiment of the present invention.

FIG. 3 shows a measurement example when the moving vehicle 10 is an aircraft (ex. an unmanned helicopter). The aircraft moves above the area while circling in the air, such that the radiation detector 20 loaded in the aircraft measures the radiations in the area repeatedly. A 3-dimensional distribution map of the radioactive substances in the wide area can be produced quickly based on the measurement data obtained in a superimposed manner.

Figure 4:
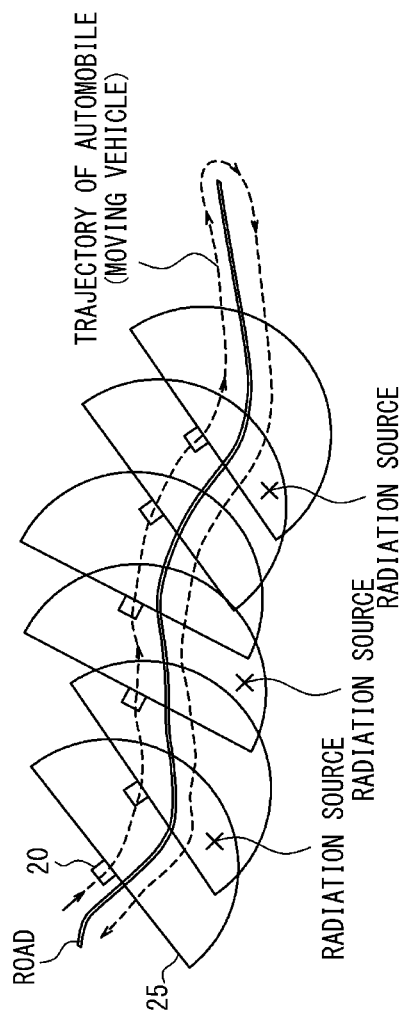
FIG. 4 is a conceptual diagram showing another measurement example according to the embodiment of the present invention.

FIG. 4 shows a measurement example when the moving vehicle 10 is a vehicle (ex. a car, or a railway vehicle). The vehicle moves along a predetermined route such that the radiation detector 20 loaded into the vehicle measures radiations in the neighborhood area of the route repeatedly. A 3-dimensional distribution map of the radioactive substances in the wide area can be produced quickly based on the measurement data obtained in a superimposed manner.

As described above, according to the present embodiment, the radiation detector 20 is loaded on the moving vehicle 10. By combining the measurement data in a plurality of positions while the moving vehicle 10 moves, the radioactive substance distribution map in the wide area is quickly produced.

Also, according to the present embodiment, it is not necessary to observe the same radiation source at the same timing from a plurality of positions. The radioactive substance distribution map can be produced by combining the measurement data acquired at different timings. Accordingly, it is unnecessary to use a plurality of radiation detectors 20 and it is enough to use the single radiation detector 20. This is suitable for the measurement easiness, flexibility and cost viewpoint.

Moreover, the fact that the measurement data which are acquired at the different timings can be used means that the measurement data of the same area can be accumulated for a constant period and the measurement data obtained in a superposed manner can be used (reference to FIG. 3 and FIG. 4). Therefore, it is possible to produce the radioactive substance distribution map in a high precision. For example, even if the radiations are weak, the correct radioactive substance distribution map can be produced by combining the measurement data obtained in a superimposed manner.

Also, the fact that the measurement data which have been acquired at the different timings can be used means that it is not necessary to observe the radiations continuously temporally. Therefore, the radiation exposure of crewmen of the moving vehicle 10 can be reduced. In other words, according to the present embodiment, the safety when the radioactive substance distribution map is produced can be improved.

Also, when a situation changes suddenly as in case of an accident of leakage of radioactive substances and in case of secret spraying of radioactive substances by terrorists, the situation can be immediately grasped although a distribution tendency of the radioactive substances changes.

As the radiation detector 20, it is suitable to use the Compton camera which has high sensitivity and a wide measurement range. Thus, a measurement time per once is reduced and the producing time of the radioactive substance distribution map can be reduced.

2. Configuration Example

2-1. Moving Vehicle 10

Figure 5:
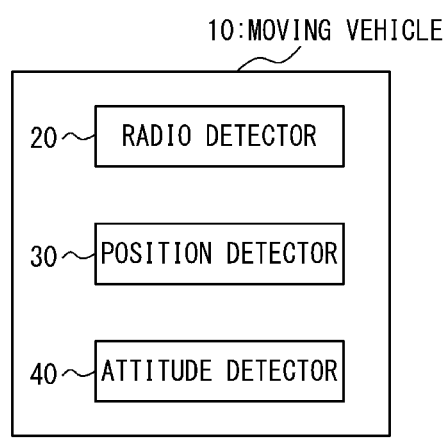
FIG. 5 is a block diagram showing a configuration example of the moving vehicle according to the embodiment of the present invention.

FIG. 5 is a block diagram showing the configuration example of the moving vehicle 10 in the present embodiment. The radiation detector 20, a position measuring unit 30 and an attitude measuring unit 40 are loaded in the moving vehicle 10.

The radiation detector 20 measures radiations from radioactive substances. As the radiation detector 20, the Compton camera is exemplified which has high sensitivity and a wide measurement range. Also, the Compton camera can measure the energy of the radiation. However, the radiation detector 20 of the present embodiment is not limited to the Compton camera and may be the radiation detector of a pinhole camera type.

The position measuring unit 30 measures the position (ex. latitude, longitude, altitude) of the moving vehicle 10. As the position measuring unit 30, GPS (Global Positioning System) is exemplified.

The attitude measuring unit 40 measures an attitude angle of the radiation detector 20 and an angular velocity. As the attitude measuring unit 40, a gyro sensor is exemplified.

2-2. Radioactive Substance Distribution Map Producing Apparatus 100

Figure 6:
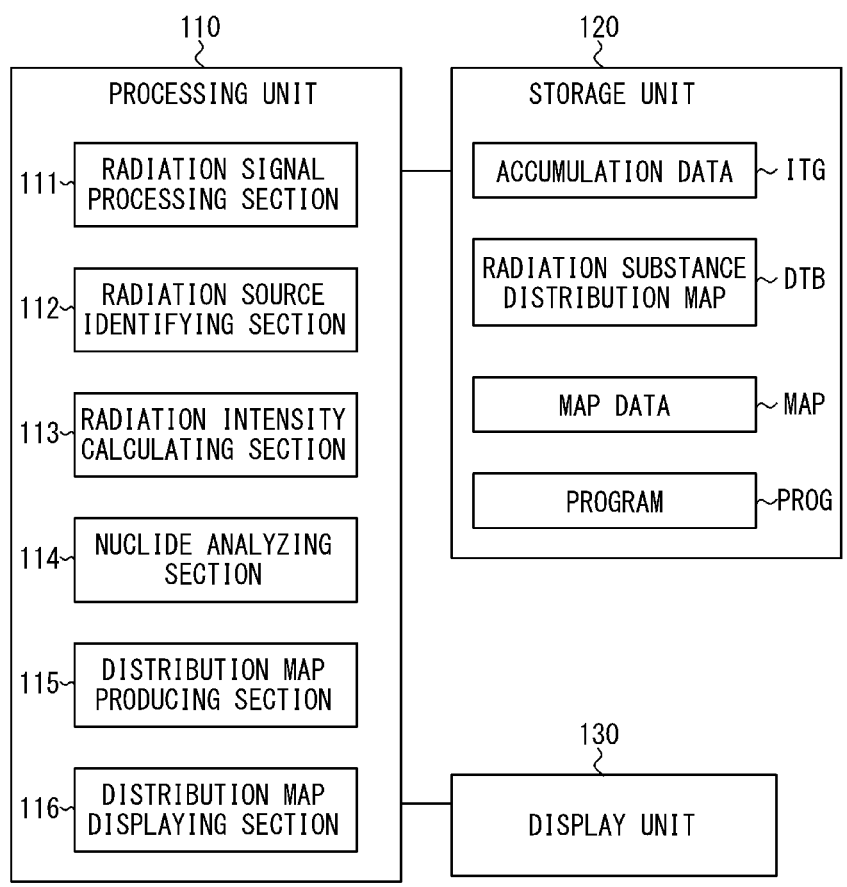
FIG. 6 is a block diagram showing a configuration example of the radioactive substance distribution map producing apparatus according to the embodiment of the resent invention.

FIG. 6 is a block diagram showing a configuration example of the radioactive substance distribution map producing apparatus 100 of the present embodiment. The radioactive substance distribution map producing apparatus 100 is a computer and includes a processing unit 110, a storage unit 120 and a display unit 130.

As the processing unit 110, a CPU and a microcomputer are exemplified. The processing unit 110 has a radiation signal processing section 111, a radiation source identifying section 112, a radiation intensity calculating section 113, a nuclide analyzing section 114, a distribution map producing section 115, and a distribution map displaying section 116, as the functional blocks. Each functional block is realized by executing a program PROG by the processing unit 110. The details of processing by each functional block will be described later.

As the storage unit 120, HDD and RAM are exemplified. Accumulation data ITG, radioactive substance distribution map DTB, map data MAP and so on are stored in the storage unit 120. Details will be described later. Also, the program PROG which is to be executed by the processing unit 110 is stored in the storage unit 120. Note that the program PROG may be recorded on a recording medium which can be read by a computer.

As the display unit 130, a liquid crystal display is exemplified.

3. Processing Flow

Figure 7:
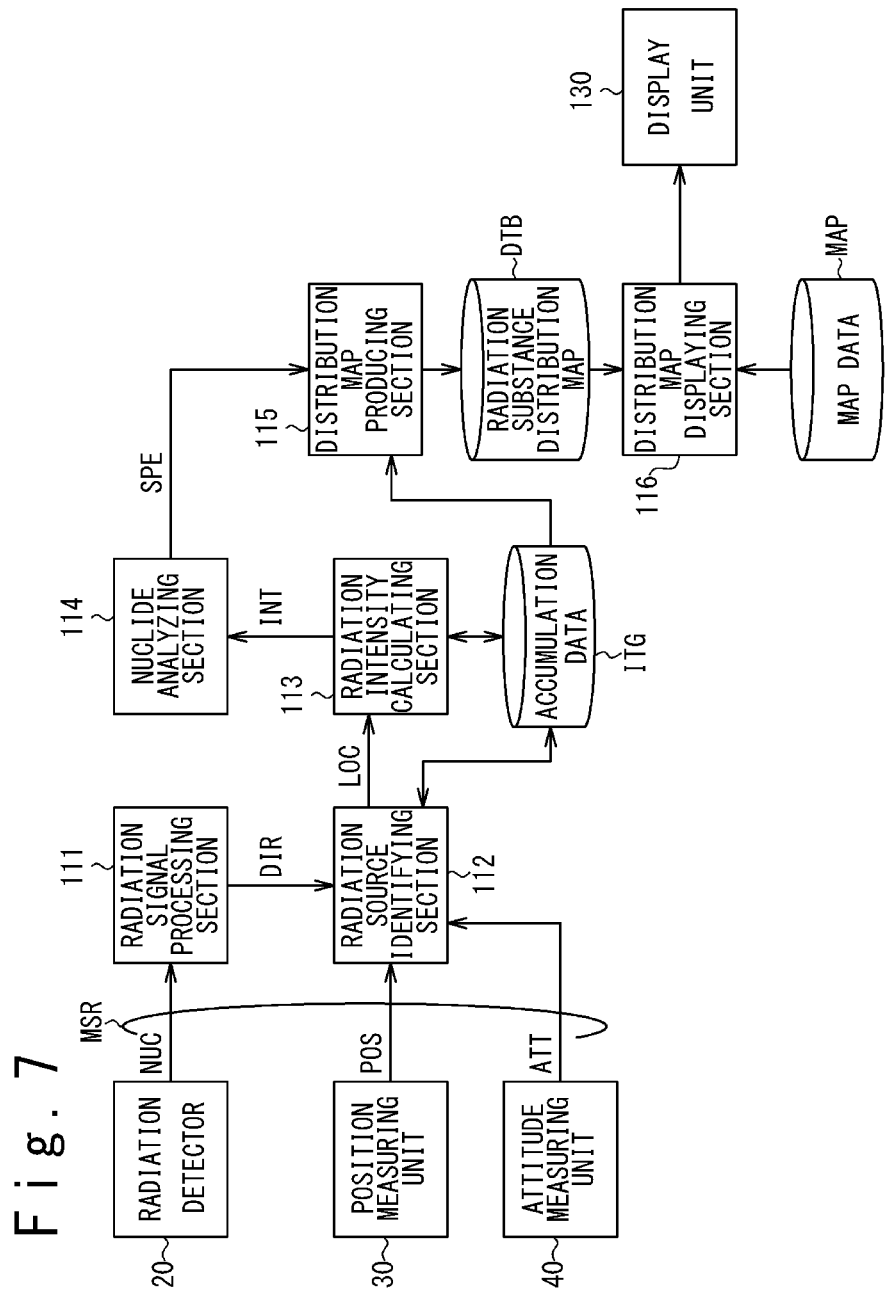
FIG. 7 is a block diagram showing a processing flow of the radioactive substance distribution map producing system according to the embodiment of the present invention.
Figure 8:
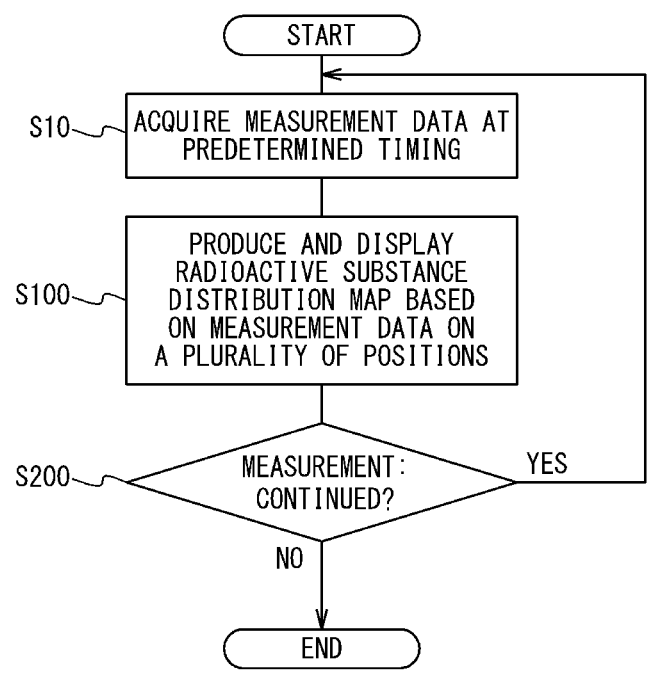
FIG. 8 is a flow chart showing a processing flow by the radioactive substance distribution map producing system according to the embodiment of the present invention.

FIG. 7 and FIG. 8 are respectively a block diagram and a flow chart showing the processing flow by the radioactive substance distribution map producing system 1 according to the present embodiment. With reference to FIG. 7 and FIG. 8, the processing flow in the present embodiment will be described.

Step S10:

The radiation detector 20 measures radiations from one or more radioactive substances and generates the radiation measurement data NUC showing the measurement result. The radiation measurement data NUC shows the intensities (energy) of the measured radiations, the detection positions of the detector, and so on. The radiation detector 20 outputs the radiation measurement data NUC to the radioactive substance distribution map producing apparatus 100.

The position measuring unit 30 measures the positions of the moving vehicle 10 and generates position data POS. For example, the position data POS shows the latitude, longitude, and altitude of the moving vehicle 10 (i.e. the radiation detector 20). The position measuring unit 30 outputs the position data POS to the radioactive substance distribution map producing apparatus 100.

The attitude measuring unit 40 measures the attitude angle and the angular velocity of the radiation detector 20 and generates attitude data ATT of the radiation detector 20 showing the measurement result. The attitude measuring unit 40 outputs the attitude data ATT to the radioactive substance distribution map producing apparatus 100.

The measurement data MSR contains the above-mentioned radiation measurement data NUC, the position data POS and the attitude data ATT. The radioactive substance distribution map producing apparatus 100 receives the measurement data MSR.

Figure 9:
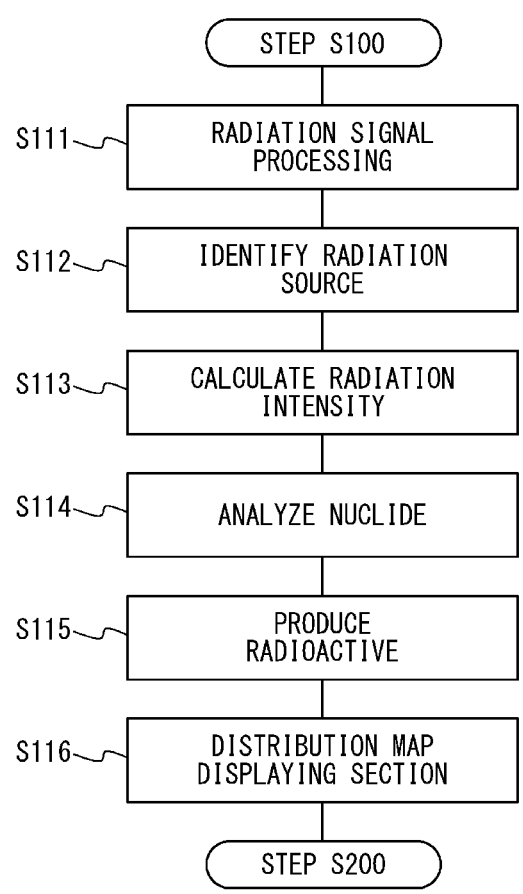
FIG. 9 is a flow chart showing a processing flow by the radioactive substance distribution map producing apparatus according to the embodiment of the present invention.

Step S100:

The radioactive substance distribution map producing apparatus 100 produces the radioactive substance distribution map DTB by combining the measurement data MSR obtained at the plurality of positions while the moving vehicle 10 moves. Also, the radioactive substance distribution map producing apparatus 100 displays the produced radioactive substance distribution map DTB on the display unit 130. FIG. 9 is a flow chart showing processing at this step S100.

Step S111:

The radiation signal processing section 111 calculates an incoming direction of the radiation, i.e. a direction of a radiation source based on the radiation measurement data NUC obtained by the radiation detector 20. The radiation signal processing section 111 generates radiation source direction data DIR showing the calculated direction of the radiation source.

Step S112:

The radiation source identifying section 112 receives the radiation source direction data DIR, the position data POS and the attitude data ATT. The radiation source identifying section 112 relates and registers the radiation source direction data DIR, the position data POS and the attitude data ATT on the accumulation data ITG. The accumulation data ITG is a lamp of data accumulated by the repetitive measurement.

Also, the radiation source identifying section 112 refers to past data accumulated as the accumulation data ITG to identify the position of the radiation source measured for this time. For example, the position of the radiation source can be identified by combining the radiation source direction data DIR, the position data POS and the attitude data ATT, which are acquired at the plurality of positions and carrying out a stereo view or pattern matching. In this way, the radiation source identifying section 112 identifies the position of the radiation source and generates the radiation source position data LOC showing the position of the radiation source. The radiation source identifying section 112 registers the generated radiation source position data LOC on the accumulation data ITG.

Step S113:

The radiation intensity calculating section 113 receives the radiation source position data LOC and the radiation measurement data NUC, and relates and registers the positions of the radiation sources and the intensities (energies) of the measured radiations on the accumulation data ITG. At this time, when the radiation intensity on the same radiation source position is already registered, the radiation intensity is registered so as to be accumulated. In other words, the radiation intensity calculating section 113 accumulates the measured radiation intensity with respect to each of the identified radiation source positions. The radiation intensity calculating section 113 generates the radiation intensity data INT showing the accumulation radiation intensities.

Step S114:

The nuclide analyzing section 114 distinguishes and determines the nuclides of the observed radioactive substances. Specifically, the nuclide analyzing section 114 produces an energy spectrum based on the radiation intensity data INT, and refers to the energy data which are peculiar to the known nuclides to distinguish the nuclides of the radioactive substances. The nuclide analyzing section 114 generates nuclide analysis data SPE showing the nuclide distinction result.

Step S115:

The distribution map generating section 115 combines the radiation source position data LOC which is registered on the accumulation data ITG and produces and updates the radioactive substance distribution map DTB. At this time, the distribution map generating section 115 may refer to the radiation intensity data INT and may produce the radioactive substance distribution map DTB to understand the radiation intensity of each radiation source. Also, the distribution map generating section 115 may refer to the nuclide analysis data SPE and may produce the radioactive substance distribution map DTB to be possible to identify every nuclide.

Step S116:

The distribution map displaying section 116 displays the produced radioactive substance distribution map DTB on the display unit 130. When the radioactive substance distribution map DTB is produced to be possible to identify every nuclide, the radioactive substance distribution map DTB is displayed on the display unit 130 to be possible to identify every nuclide. Also, the distribution map displaying section 116 may read the map data MAP showing a map which is published by the country geography board, and display the radioactive substance distribution map DTB on the map.

Step S200:

Referring to FIG. 8 again, when the measurement is continued (step S200; Yes), the processing returns to the above-mentioned step S10. When the measurement is ended (step S200; No), the processing ends.

4. Modification Example

Figure 10:
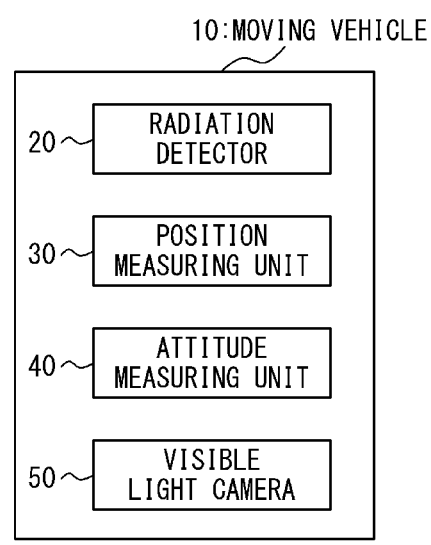
FIG. 10 is a block diagram showing a modification example of the configuration example of the moving vehicle.
Figure 11:
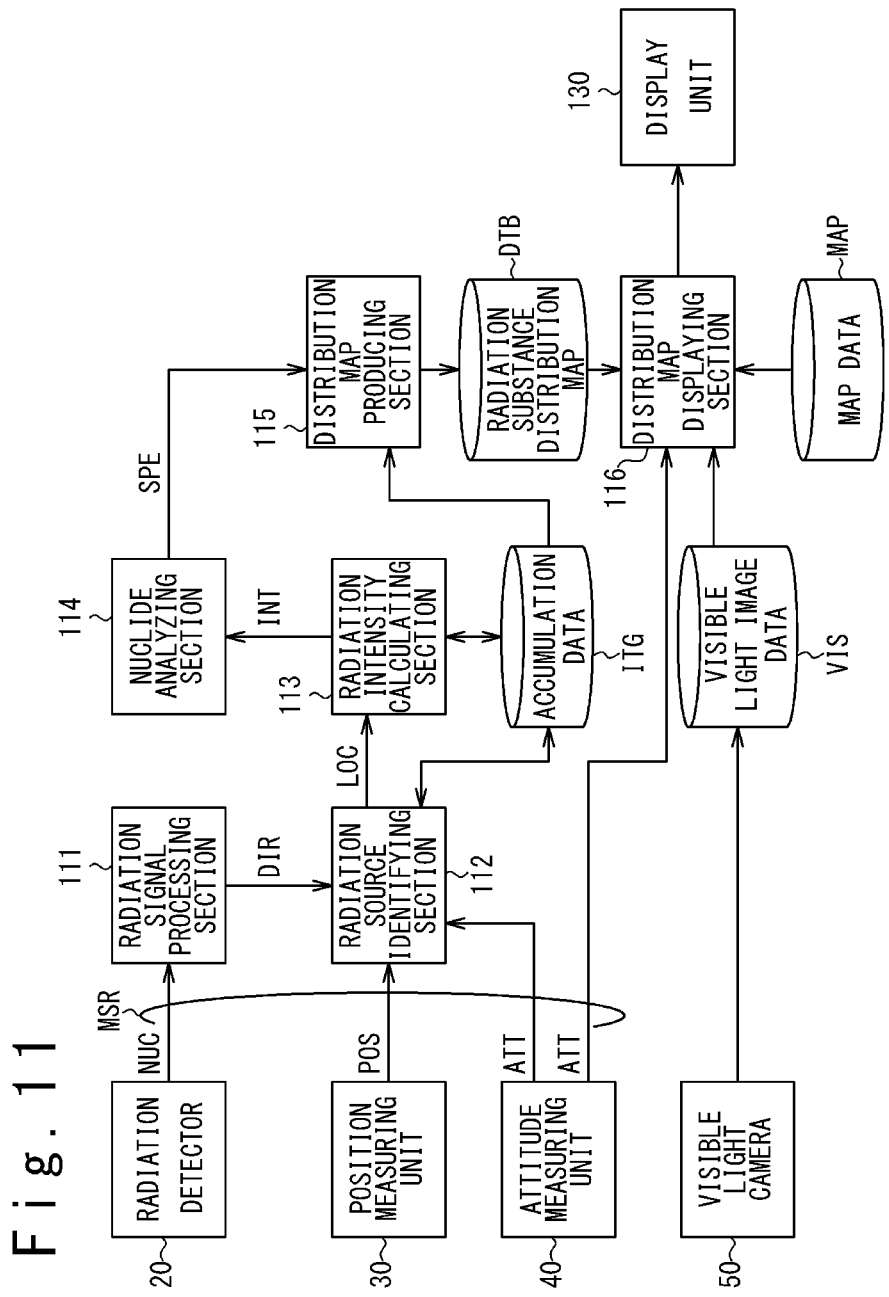
FIG. 11 is a block diagram showing a processing flow in the modification example of the radioactive substance distribution map producing system.

Next, a modification example of the present embodiment will be described. FIG. 10 is a block diagram showing a configuration example of the moving vehicle 10 in the modification example. FIG. 11 is a block diagram showing a processing flow of the modification example. The description which overlaps the above-mentioned description is appropriately omitted.

In this modification example, a visible light camera 50 is further loaded on the moving vehicle 10. The visible light camera 50 takes a visible light image and generates visible light image data VIS. The radioactive substance distribution map producing apparatus 100 receives the visible light image data VIS. The distribution map displaying section 116 refers to the visible light image data VIS and the attitude data ATT and superimposes the radioactive substance distribution map DTB on the visible light image to display on the display unit 130. Thus, it is possible to superimpose the radioactive substance distribution map DTB and the visible light image to display in the viewpoint of the moving vehicle 10 in real-time.

5. Conclusion

As described above, according to the present embodiment, the radiation detector 20 is loaded on the moving vehicle 10. By combining the measurement data MSR obtained at the plurality of positions while the moving vehicle 10 moves, the radioactive substance distribution map DTB in the wide area is quickly produced.

Also, according to the present embodiment, it is not necessary to observe a same radiation source at a same timing from a plurality of positions. The radioactive substance distribution map DTB can be produced by combining the measurement data MSR acquired at the different timings. Accordingly, it is not required to use a plurality of radiation detectors 20 and it is enough to use a single radiation detector 20. This is suitable for the measurement easiness, flexibility and cost viewpoint.

Moreover, the fact that the measurement data MSR acquired at the different timings are available means that the measurement data MSR to the same area is accumulated for a constant period and the accumulated measurement data MSR is available (reference to FIG. 3 and FIG. 4). Therefore, it is possible to produce the radioactive substance distribution map DTB in a high precision. For example, even if a quantity of radiations is little, the correct radioactive substance distribution map DTB can be produced by combining the measurement data MSR obtained in a superimposed manner.

Also, the fact that the measurement data MSR acquired at the different timings are available means that it is not necessary to observe the radiations continuously temporally. Therefore, a reception quantity of radiation exposure by the crewmen of the moving vehicle 10 can be reduced. In other words, according to the present embodiment, the safety can be improved in case of producing the radioactive substance distribution map DTB.

Also, when the situation changes suddenly as in a leak accident of the radioactive substances and in the spraying of the radioactive substances by terrorists secretly, the situation can be immediately grasped although the distribution tendency of the radioactive substances changes.

As the radiation detector 20, it is suitable to use the Compton camera which has a high sensitivity and a wide measurement range. Thus, the measurement time per once can be reduced, and the producing time of the radioactive substance distribution map can be reduced.

The radioactive substance distribution map producing system 1 according to the present embodiment can be applied to an atomic field (visualization of radioactive substances at the time of decontamination in a nuclear power plant accident and so on, radiation monitor in an atomic power plant, radiation monitor of low radioactive waste), a resource field (monitor of natural origin radioactive material (NORM)), a safe security field (search of the radioactive substances hidden through a terrorism, production of distribution map of sprayed radioactive substances).

As described above, the embodiments of the present invention have been described with reference to the attached drawings. However, the present invention is not limited to the above-mentioned embodiments and can be appropriately modified and changed in a range of not-stepping out the gist by a person skilled in the art.

This application is based on Japanese Patent Application JP 2013-013672 which was filed on Jan. 28, 2013, and claims a priority of it. The disclosure thereof is incorporated herein by reference.

The invention claimed is:

1. A radioactive substance distribution map producing system comprising:
   a radiation detector loaded on a moving vehicle to measure radiations from one or more radioactive substances as radiation sources to continue to generate radiation measurement data indicating incidence directions of the radiations for every timing while the moving vehicle is moving through a predetermined moving route;
   a position detector disposed in the moving vehicle to continue to generate position data indicating a position of the moving vehicle for every timing while the moving vehicle is moving through the predetermined moving route;
   an attitude detector disposed in the moving vehicle to continue to generate attitude data indicating an attitude of the radiation detector for every timing while the moving vehicle is moving through the predetermined moving route; and
   a radioactive substance distribution map producing apparatus comprising a display device, a storage device storing a program, and a processing section executing the program to realize a radiation source position identifying section, a nuclide identifying section, and a distribution map generating section,
   wherein the radiation source position identifying section generates radiation source position data for every timing from the radiation measurement data, the attitude data and the position data to accumulate the radiation source position data and the radiation measurement data,
   wherein the nuclide identifying section generates radiation intensity data from the radiation measurement data to accumulate the radiation intensity data and the radiation source position data in the storage device, and generates nuclide data from the accumulated radiation intensity data and the accumulated radiation source position data, and
   wherein the distribution map generating section produces a radioactive substance distribution map from the accumulated radiation source position data and the accumulated radiation intensity data to display the produced distribution map on the display device, and changes the produced distribution map to display a nuclide-identifiable radioactive substance distribution map on the display device.

2. The radioactive substance distribution map producing system according to claim 1, wherein the radiation detector comprises a Compton camera.

3. The radioactive substance distribution map producing system according to claim 1, wherein the radioactive substance distribution map producing apparatus displays the produced distribution map on the display device so as to superimpose a map and the produced distribution map.

4. The radioactive substance distribution map producing system according to claim 1, further comprising:
   a visible light camera loaded on the moving vehicle,
   wherein the radioactive substance distribution map producing apparatus receives a visible light image taken by the visible light camera, and displays the produced distribution map on the display device so as to superimpose the visible light image and the produced distribution map.

5. The radioactive substance distribution map producing system according to claim 1, wherein the moving vehicle is an aircraft.

6. The radioactive substance distribution map producing system according to claim 1, wherein the moving vehicle is an automobile.

7. A method of producing a radioactive substance distribution map, comprising:
   measuring radiations from one or more radioactive substances as radiation sources by using a radiation detector loaded on a moving vehicle for every timing while the moving vehicle is moving through a predetermined moving route;
   generating position data indicating a position of the moving vehicle for every timing while the moving vehicle is moving through the predetermined moving route;
   generating attitude data indicating an attitude of the radiation detector for every timing while the moving vehicle is moving through the predetermined moving route;
   generating direction data indicating directions of the radiation sources based on the measurement result by the radiation detector and the attitude data;
   generating radiation source position data from the attitude data of the radiation detector, the position data of the moving vehicle, and the direction data of the radiation sources acquired at a plurality of timings while the moving vehicle is moving;
   producing a distribution map of the radioactive substances from the radiation source position data;
   generating radiation intensity data from the measurement result of the radiation detector to accumulate the radiation intensity data and the radiation source position data;
   generating nuclide data from the accumulated radiation intensity data and the accumulated radiation source position data; and
   changing the produced distribution map to display a nuclide-identifiable radioactive substance distribution map on a display device.

* * * * *